May 22, 1951

C. E. KRONQUEST 2,554,197

ELECTRIC FISHING SIGNAL

Filed July 28, 1947

INVENTOR.

CRETE E. KRONQUEST

BY Victor J. Evans & Co.

ATTORNEYS

May 22, 1951 C. E. KRONQUEST 2,554,197
ELECTRIC FISHING SIGNAL
Filed July 28, 1947 2 Sheets-Sheet 2

INVENTOR.
CRETE E. KRONQUEST
BY Victor J. Evans & Co.

ATTORNEYS

Patented May 22, 1951

2,554,197

UNITED STATES PATENT OFFICE 2,554,197

ELECTRIC FISHING SIGNAL

Crete E. Kronquest, North Platte, Nebr.

Application July 28, 1947, Serial No. 764,184

2 Claims. (Cl. 43—17)

This invention relates to a fishing tackle box having an audible, as well as a visual, fishing signal attached thereto, which is especially designed for night fishing, but may be used equally as well during daylight hours.

An object of the invention is to provide an improved fishing tackle box that is a portable self-contained structure, embodying therein an audible and visual electrical signalling means which will notify the attendant fisherman when there is a nibble or strike on one of the fishing lines used in conjunction therewith.

With this type of equipment, it is impossible for a fish to strike a line and carry away unattended fishing rods and reels. It will also increase the fisherman's catch, since the instant the fish strikes the line, the signals will indicate such strike to the fisherman, and he can immediately attempt to land the fish.

It enables a fisherman to perform other necessary tasks while fishing, giving the fisherman sufficient warning to stop whatever he is doing to get his rod and reel and land the fish.

The visual signal enables the fisherman to remove his fish and rebait his hook before he recasts, and after the line is back in the water, the signal can be turned off.

The greatest advantage, however, of this invention, is the prevention of the loss of valuable fishing equipment.

With the above and other objects and advantages in view, the invention consists of the novel details of construction, arrangement and combination of parts more fully hereinafter described, claimed and illustrated in the accompanying drawings in which:

Figure 1:
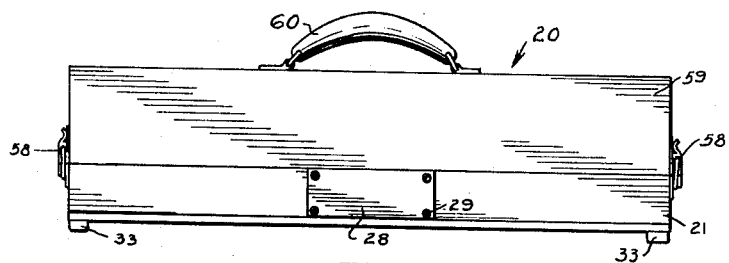
Figure 1 is an elevational view of an embodiment of the invention with the cover in place.

Referring more in detail to the drawings, the reference numeral 20 designates a tackle box constructed in accordance with the invention. The box 20 comprises the box-like body 21 having the lid or top 22 hinged thereto at 23.

Figure 7:
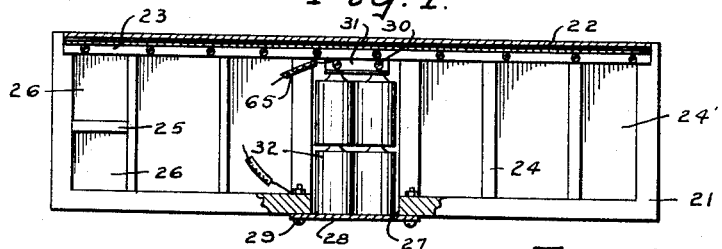
Figure 7 is a plan view partly in elevation and partly in section with the lid or top in raised position.
Figure 8:
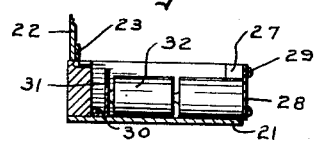
Figure 8 is a transverse sectional view of Figure 7 through the batteries.
Figure 10:
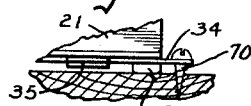
Figure 10 is a detailed sectional view showing one method of attaching the box to a support.

The body is provided with transverse partitions 24 which divide the body into small compartments 24' for fishing equipment or the like. A short partition 25, extending transversely of one of the compartments 24' divides this compartment into half compartments 26, as clearly shown in Figure 7, in which the lid 22 is raised for inspection of the interior of the body 21.

The body 21, at the center of the front thereof, is provided with an opening 27, which is closed at its exterior end by the metal contact plate 28 secured to the body 21 by bolts 29. Secured to the bottom of the body 21, in alinement with the plate 28, by screws 30, is a second contact plate 31, and the batteries 32 have current supplying engagement with the contact for a purpose to be later described.

The bottom of the body 21 is provided with feet 33 which elevate the box so that the anchor bars 34 may be slidably mounted on the bottom of the body 21 by means of the brackets 35, and the outer ends of the bars are provided each with an opening 36 and a notch 36' for a purpose to be later described.

The lid 22 has secured to its upper surface centrally thereof, an audible signal 37. On opposite sides of the signal 37, the lid is provided with openings 38 to accommodate in each, the inclined end 39 of the trigger 40, having the forked upper end 41 for a purpose to be later described.

Figure 9:
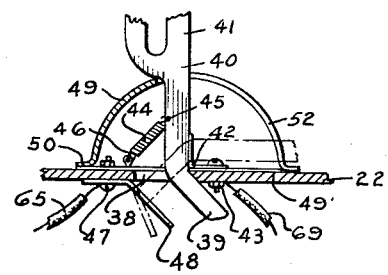
Figure 9 is a detailed sectional view of one of the triggers.

The trigger 40 has one leaf of a hinge 42 secured thereto, while the other leaf is secured to the lid 22 by a bolt 43. A spring 44 secured at 45 to the trigger 40 and the eye 46, which is mounted on the lid 22 retains the trigger in raised position, as shown in Figure 9. A bolt 47, in the lid, adjacent the eye 46, secures to the lid an angular contact 48 which is in the path of the end 39 of the trigger 40. Covering each of the triggers is a cover 49 arcuate in formation, and provided with the annular flange 50, whereby, by means of screws 51, the cover is screwed to the lid 22, and an insulation ring 49' prevents shortage between the cover and the trigger during the operation thereof. An elongated slot 52 in the cover 49, permits the movement of the trigger 40 to the dotted line position shown in Figures 3 and 9. At each outer end of the lid 22, a switch is located. Switch 53 is the main off and on switch, and switch 54 is the two-way light control switch.

At the longitudinal hinged edge of the lid 22, there is mounted a bar 55 having line guides 56 formed thereon adjacent the outer ends thereof.

The lid is retained in closed position by the hook catch 57, and luggage catches 58 retains the cover 59 on the body 21. The cover 59 is provided with a handle grip 60, for the carrying of the box, and cross bars 61, secured to the top by fasteners 62, which secure the grip to the lid, strengthen the cover in the carrying thereof.

The cover, on the inside, is provided with hangers 63, which support the anchor rods 64 when in carrying position.

Figure 12:
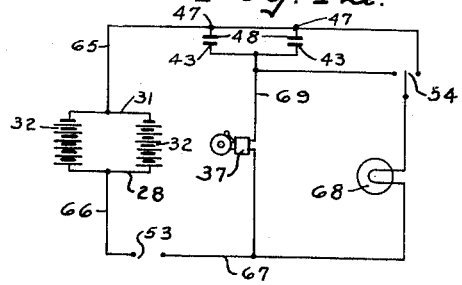
Figure 12 is a diagrammatic view of the electrical circuit.

Referring to Figure 12, it will be noted that a wire 65 is connected to plate 31, and to the bolts 47 for the contacts 48, and then to one pole of the switch 54. A wire 66 is connected to switch 53, and a wire 67 connects this switch to the audible signal 37 and the visual signal 68 carried by the casing for the signal 37. The audible signal is connected by a wire 69 to bolts 43 and to the opposite pole of the switch 54, while the visual signal 68 is connected to the throw lever of the switch 54.

Figure 11:
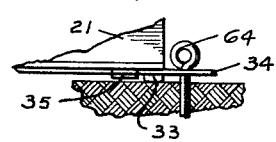
Figure 11 is the same to the ground.

In use, the cover is removed, and the rods 64 removed therefrom if the box is to be secured to the ground, as shown in Figure 11.

The bars 34 are slid outwardly of the bottom of the body 21, then the rods 64 are inserted through the openings 36 into the ground, to firmly hold the body 21.

If the support is a dock or other wooden device, screws 70 may be permanently set therein, and by engaging the notches 36' the body 21 will be retained in position thereon.

Figure 2:
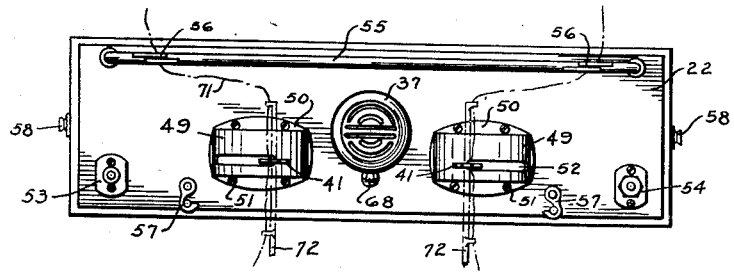
Figure 2 is a top plan view with the cover removed.
Figure 3:
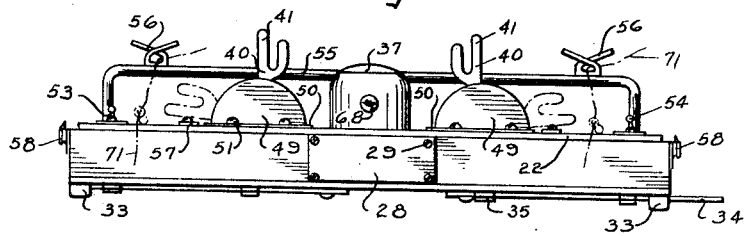
Figure 3 is a side view with the cover removed.
Figure 4:
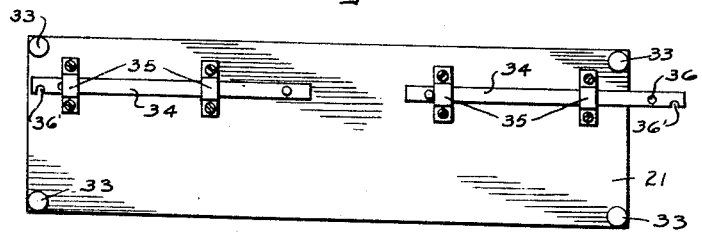
Figure 4 is a bottom plan view.
Figure 5:
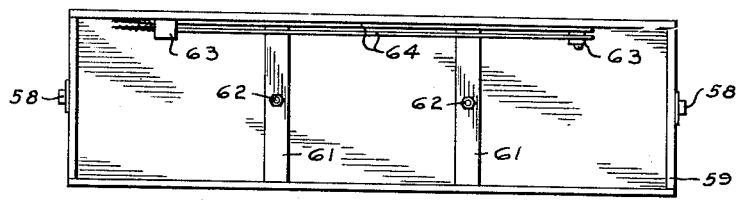
Figure 5 is a bottom plan view of the cover.
Figure 6:
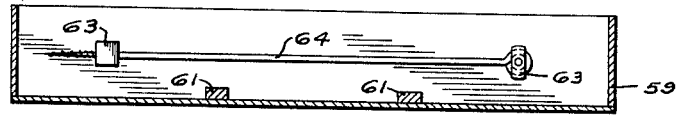
Figure 6 is a longitudinal sectional view of the cover.

The triggers 40 are then moved to vertical position, as shown in Figures 2 and 3. Switch 53 is turned on, but if it is for daylight fishing, the switch lever of the switch 54 is left in open position.

The bait is then cast into the water and the fishing line 71 is drawn through the guides 56. Two rods are used if desired. The rod 72 is then placed in the forked end 41 of the trigger 40, and the brakes are set on the reels on the rods. When the line is jerked by a strike thereon, the rod will be pulled toward the guide 56 causing the trigger 40 to move to the dotted line position shown in Figure 9. With the end 39 engaging the contact 48, and the trigger engaging the bolt 43, the circuit is closed, and the audible signal is sounded. If used for night fishing, the switch 54 will be closed so that the visual signal 68 will be illuminated at the same time the audible signal 37 is sounded. Pushing the trigger 40 to its vertical position breaks the current and shuts off both signals.

If further light is desired, the lever of switch 54 is thrown in the opposite direction, and when it is no longer desired, the lever is returned to its previous signalling position.

It will be understood that as soon as the signals indicate a strike, the rod is removed from the box and the fish landed. After the operation, the device can then be put back into use as previously described.

There has thus been provided a device which will be of great assistance to a fisherman, either at night or during daylight hours, and it is believed that from the foregoing description, the structure and operation thereof will be obvious to those skilled in the art.

It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. In a tackle box having a body provided with a hinged lid, the improvement comprising, an audible signal and a visual signal mounted on said lid, contacts carried by said box and connected to said signals, current supplying means engaging said contacts, spring actuated pivoted trigger means carried by said lid between said contacts and said signals, and line guide means adapted to coact with a fishing line trained over said trigger means so that movement of said line will cause movement of said trigger means for the energizing of said signals.

2. The invention as in claim 1 wherein said trigger means is provided with a forked upper end to receive the fishing line and an inclined lower end, said contacts being adapted for engagement with the lower end of said trigger means upon movement of said trigger means by said fishing line.

CRETE E. KRONQUEST.

REFERENCES CITED

The following references are of record in the file of this patent:

UNITED STATES PATENTS

| Number | Name | Date |
|---|---|---|
| 522,352 | Poppowitsch | July 3, 1894 |
| 1,737,921 | Derr | Dec. 3, 1929 |
| 2,446,794 | Thornton | Aug. 10, 1948 |

FOREIGN PATENTS

| Number | Country | Date |
|---|---|---|
| 37,681 | Norway | Aug. 20, 1923 |
| 43,191 | Sweden | Oct. 24, 1917 |